United States Patent
Schoeneberger et al.

(10) Patent No.: US 8,518,365 B2
(45) Date of Patent: Aug. 27, 2013

(54) METHOD AND SYSTEM FOR THE PRODUCTION OF SULFURIC ACID

(75) Inventors: Jan Schoeneberger, Dortmund (DE); Holger Thielert, Dortmund (DE)

(73) Assignee: ThyssenKrupp Uhde GmbH, Dortmund (DE)

(*) Notice: Subject to any disclaimer, the term of this patent is extended or adjusted under 35 U.S.C. 154(b) by 0 days.

(21) Appl. No.: 13/388,733

(22) PCT Filed: Jul. 12, 2010

(86) PCT No.: PCT/EP2010/059954
§ 371 (c)(1),
(2), (4) Date: Mar. 21, 2012

(87) PCT Pub. No.: WO2011/015424
PCT Pub. Date: Feb. 10, 2011

(65) Prior Publication Data
US 2012/0171110 A1    Jul. 5, 2012

(30) Foreign Application Priority Data
Aug. 6, 2009 (DE) .......................... 10 2009 036 289

(51) Int. Cl.
*C01B 17/74* (2006.01)
*C01B 17/80* (2006.01)

(52) U.S. Cl.
USPC .......................... 423/522; 422/161

(58) Field of Classification Search
USPC .......................... 423/522; 422/161
See application file for complete search history.

(56) References Cited

U.S. PATENT DOCUMENTS

| | | | |
|---|---|---|---|
| 5,288,303 A | 2/1994 | Woracek et al. | |
| 5,683,670 A | 11/1997 | Peng | |
| 6,149,886 A | 11/2000 | Schoubye | |
| 2007/0110663 A1* | 5/2007 | Christensen | 423/522 |

FOREIGN PATENT DOCUMENTS

DE 207 182 2/1984

OTHER PUBLICATIONS

International Search Report of PCT/EP2010/059954, date of mailing Oct. 6, 2010.
Dunn et al., "Oxidation of Sulfur Dioxide to Sulfur Trioxide over Supported Vanadia Catalysts," Applied Catalysis B: Environmental, vol. 19, pp. 103-117, 1998.
International Preliminary Report on Patentability dated Feb. 7, 2012 and Written Opinion of the International Searching Authority of PCT/EP2010/059954.

* cited by examiner

*Primary Examiner* — Timothy Vanoy
(74) *Attorney, Agent, or Firm* — Collard & Roe, P.C.

(57) ABSTRACT

The invention relates to a method and an installation for producing sulfuric acid. First of all, a product gas flow (5) containing sulfur dioxide is produced. The product gas flow (5) is supplied to a reaction chamber (1). A catalyst (3) is located in the reaction chamber (1). In the presence of the catalyst sulfur dioxide reacts to form sulfur trioxide. In further parts of the installation the resulting sulfur trioxide is converted to sulfuric acid. According to the invention, an oxidizing gas flow (6) is supplied to the reaction chamber (1) alternately with the product gas flow (5).

10 Claims, 4 Drawing Sheets

METHOD AND SYSTEM FOR THE PRODUCTION OF SULFURIC ACID

CROSS REFERENCE TO RELATED APPLICATIONS

Figure 1A:
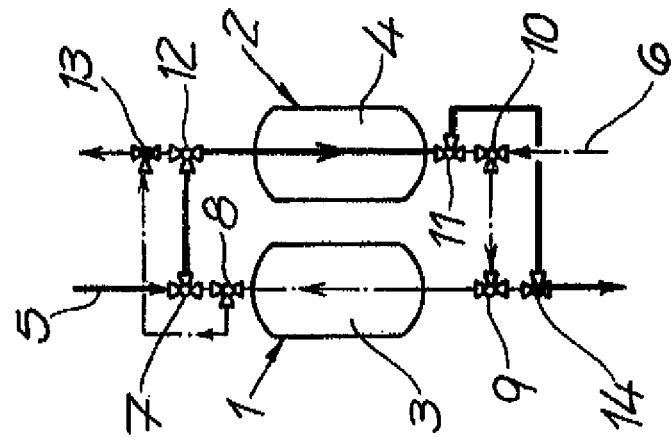

This application is the National Stage of PCT/EP2010/059954 filed on Jul. 12, 2010, which claims priority under 35 U.S.C. §119 of German Application No. 10 2009 036 289.4 filed on Aug. 6, 2009, the disclosure of which is incorporated by references. The international application under PCT article 21(2) was not published in English.

The invention relates to a method and a system for the production of sulfuric acid, whereby a product gas stream containing sulfur dioxide is produced, which is supplied to a reaction chamber, in which a reaction takes place, turning sulfur dioxide into sulfur trioxide in the presence of a catalyst, and the resulting sulfur trioxide is converted to sulfuric acid in further sections of the system.

Sulfuric acid is one of the most important basic chemicals. Its production on a commercial scale takes place in three steps:
1. Preparation of sulfur dioxide ($SO_2$),
2. Oxidation of sulfur dioxide ($SO_2$) to sulfur trioxide ($SO_3$),
3. Conversion of sulfur trioxide ($SO_3$) to sulfuric acid ($H_2SO_4$).

The traditional method of production of sulfuric acid is also referred to as the contact process in the literature.

Elementary sulfur can serve as the starting material for sulfuric acid production. It occurs in the desulfurization of crude oil or natural gas in refineries, or in the roasting of sulfide ores, as well as in the desulfurization of flue gases from coal-fired power plants. If sulfur serves as the raw material, sulfur dioxide is produced by combustion of the sulfur in atomization burners, whereby the liquid sulfur is pressed into the burner nozzle at high pressure.

Sulfur dioxide can also be produced by combustion or catalytic conversion of waste gases containing hydrogen sulfide, which are produced, for example, in the purification of coke oven gases.

The formation of nitrogen oxides ($NO_x$) must be avoided in connection with the combustion of the sulfur source, for example hydrogen sulfide in the case of wet catalysis or liquid sulfur from Claus plants. For this reason, temperatures are not allowed to exceed 1200° C. However, in order to nevertheless achieve complete conversion of the sulfur source to sulfur dioxide, the combustion process can be managed with a high oxygen surplus, whereby a cooling effect is brought about by the nitrogen and the non-converted oxygen. However, in this way, an increased amount of atmospheric moisture is also introduced into the process. This lowers the maximum concentration of product acid that can be achieved. Alternatively, inert cold gas can be supplied to the combustion process, as is the case with the cold-gas recycle process. However, this measure leads to large quantities of circulated gas. As a result, the apparatuses needed further on in the process must be designed for greater gas streams.

The crude gas produced in the first production step usually has an $SO_2$ content between 3 and 12 vol.-%. The crude gas is generally cooled in a heat recovery boiler and diluted, possibly with air, to achieve a hyperstoichiometric $O_2/SO_2$ ratio. The exothermic reaction turning $SO_2$ into $SO_3$ takes place on catalysts, for example vanadium pentoxide ($V_2O_5$), at temperatures between 400 and 650° C. In traditional methods, the conversion of $SO_2$ to $SO_3$ is managed with a large air surplus. There are two reasons for this. For one thing, a high oxygen concentration shifts the reaction equilibrium in the direction of the sulfur trioxide. For another, the air is used to cool the gas between two reactor beds, thereby making it possible to save on heat exchangers.

The $SO_3$ formed in the second production step is cooled and supplied to an absorber. The absorber contains a bulk packing that is sprinkled from above with circulated sulfuric acid. The $SO_3$ gas flowing in counter-current is absorbed by the sulfuric acid, and reacts with the water that is present, to form sulfuric acid.

It is the task of the invention to make available a method in which a high yield of sulfuric acid is achieved with a small amount of catalyst. Furthermore, the apparatuses used should be as small as possible in relation to the amount of sulfuric acid produced, and therefore be dimensioned in cost-advantageous manner.

This task is accomplished, according to the invention, in that an oxidation gas stream is supplied to the reaction chamber, alternating with the product gas stream.

During the first phase of a cycle in the reaction chamber, the $SO_2$ contained in the product gas stream reacts with the oxygen bound to the catalyst, to produce $SO_3$. The first phase is therefore also referred to as the reaction phase. In the method according to the invention, the metal phase of the catalyst is saturated with oxygen in the previous cycle. Only small amounts of oxygen are present in the product gas stream during the reaction phase. In a preferred variant of the method, the product gas stream contains an oxygen component of less than 1 mol-%, preferably less than 0.5 mol-%. The product gas stream can also be entirely free of oxygen. The $SO_2$ takes the oxygen needed for oxidation from the catalyst.

The proportion of sulfur dioxide in the product gas stream preferably amounts to more than 1 mol-% and less than 20 mol-% at the entrance to the reaction chamber. In a particularly advantageous variant of the method, the product gas stream contains a sulfur dioxide component of more than 3 mol-% and less than 12 mol-% at the entrance.

According to the invention, during the second phase of a cycle, an oxidation gas stream flows over the catalyst in the reaction chamber. The in-flow of product gas into this reaction chamber is stopped during the second phase.

In an advantageous embodiment of the method, the oxidation gas stream contains an oxygen component of over 10 vol.-%. Air is preferably used as the oxidation gas stream. Gas mixtures having an oxygen component of over 21 vol.-% or pure oxygen can also be used. The oxidation gas stream preferably contains no gas components that reduce the catalyst. It has proven to be particularly advantageous if the oxidation gas stream is free of sulfur dioxide.

Part of the oxygen contained in the oxidation gas stream is bound by the catalyst during the second phase. The second phase is therefore also referred to as the oxygen saturation phase. Above a temperature of 300° C., liquefaction of the previously solid metal phase on the catalyst surface can occur. Sulfur trioxide still bound on the catalyst surface can be present from the reaction phase, and this is now released. The oxygen from the oxidation gas stream passes over into the metal phase. This oxygen transport continues until the metal phase of the catalyst is saturated.

A catalyst bed is disposed in the reaction chamber. The catalyst bed is preferably configured as a bulk catalyst packing. The bulk catalyst packing can consist of extruded pellets, onto which a thin layer of active catalyst substance has been applied. The use of monolithic molded bodies is also conceivable. The monoliths can be interlaced with channels through which the reaction mixture flows. The surface of the channels is coated with the active catalyst substance.

It has proven to be advantageous if multiple catalyst beds are disposed in the reaction chamber, on which the $SO_2$ to $SO_3$ reaction takes place. It is advantageous if a bulk catalyst packing is situated on the bottom of each tray in the contact reactor. Because the conversion of $SO_2$ into $SO_3$ is an exothermic reaction, it has proven to be advantageous for an intermediate cooling phase to follow each tray.

Vanadium pentoxide $V_2O_5$ is preferably used as the catalytically active substance, on which the $SO_2$ to $SO_3$ conversion takes place in an oxygen-saturated liquid metal phase (Saturated Metal Phase—SMP).

In a particularly advantageous embodiment of the invention, the method has at least one further reaction chamber. In one phase, while the oxidation gas stream is conducted through the first reaction chamber, the product gas stream flows through the second reaction chamber. In this way, continuous operation of the sulfuric acid production system is made possible. When the oxidation gas stream is flowing through the first reaction chamber, the second reaction chamber takes over the conversion of $SO_2$ to $SO_3$ in the product gas stream.

Preferably, during a phase in which the product gas stream is supplied to the first reaction chamber, the oxidation gas stream is supplied to the second reaction chamber. At the end of this phase, the guidance of the gas streams is changed in such a manner that the oxidation gas stream is supplied to the first reaction chamber and the product gas stream is supplied to the second reaction chamber. This cycle is repeated cyclically.

The reaction chambers are generally independent reactors, in each instance. In the method according to the invention, more than two reactors can also be used, whereby an even number is recommended, because they can always be operated in pairs, in alternating operation. Fundamentally, the possibility also exists of disposing two reaction chambers, which are operated together in alternating operation, within a reactor. Implementation of the method according to the invention on a commercial scale can therefore involve either two contact towers or integrated reactor concepts, such as multibed towers or ring reactors.

The reaction chambers are operated alternately between a reaction phase and an oxygen saturation phase. While the product gas stream that contains sulfur dioxide is supplied to the first reaction chamber, the oxidation gas stream that contains oxygen flows through the second reaction chamber. The direction of the gas streams is then switched. One cycle therefore comprises a reaction phase and an oxygen saturation phase per reaction chamber.

In the reaction of sulfur dioxide to sulfur trioxide, a reaction equilibrium is reached:

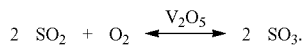

Depending on where the equilibrium is reached, a residual amount of sulfuric acid and oxygen is therefore present on the educt side. Because of the previous saturation of the metal phase of the catalyst with oxygen, only the proportion of oxygen required according to the expected equilibrium position has to be supplied to the catalyst bed. The oxygen needed for the reaction comes from the metal phase of the catalyst.

By alternately applying a product gas stream rich in sulfur dioxide and then an oxidation gas stream rich in oxygen to the catalyst beds, the reaction rate is maximized. In the method according to the invention, the reaction rate is very high, despite the low oxygen supply. The amount of catalyst needed in order to achieve a specific reaction equilibrium can be significantly reduced. As a result, a significantly smaller reactor volume is needed as compared with traditional methods.

Furthermore, in the method according to the invention, the gas stream supplied to the downstream processes following the conversion of $SO_2$ to $SO_3$ is reduced, because the product gas stream only contains small amounts of oxygen. As a result, the apparatuses used in the downstream processes, such as heat exchangers or gas scrubbers, for example, can be designed to be smaller, which leads to a cost reduction.

It has proven to be particularly beneficial if the oxidation gas stream is used to produce the gas stream that contains sulfur dioxide, after it has flowed through a reaction chamber. In the reaction chamber, the catalyst is saturated with oxygen from the oxidation gas stream. As a result, the proportion of oxygen in the oxidation gas stream is reduced. After the reaction chamber, the oxidation gas stream has remaining oxygen proportions of only 15 mol-%, on average. Because of the smaller oxygen component, the temperature generated during conversion of the sulfur source to $SO_2$ is lowered. As a result, the formation of nitrogen oxides ($NO_x$) is reduced.

The sulfuric acid system according to the invention is equipped with fittings to direct the gas streams. Three-way valves are preferably used for this. The fittings can be actuated by adjusting drives. For this purpose, electrical, pneumatic or hydraulic adjusting drives can be used. The fittings can be actuated, according to the invention, in such a manner that an air stream can be supplied to the reaction chambers alternating with the product gas stream.

In a particularly advantageous variant of the method, the valves controlling the direction of the gas streams are switched in such a manner that the product gas stream and the oxidation gas stream pass through the reaction chambers, in each instance, in opposite directions.

Figure 1B:
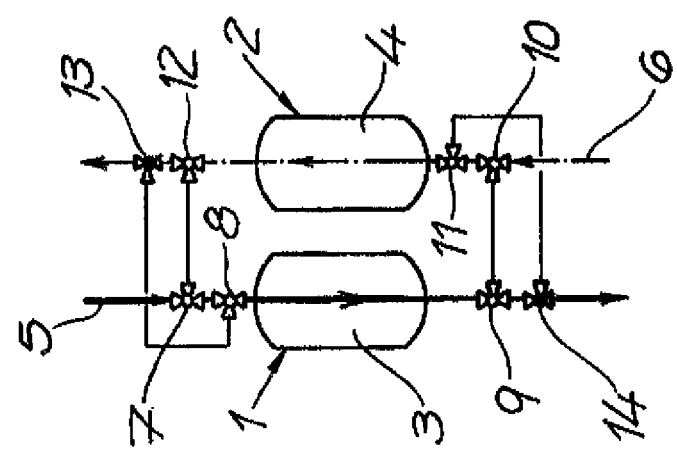
Figure 1C:
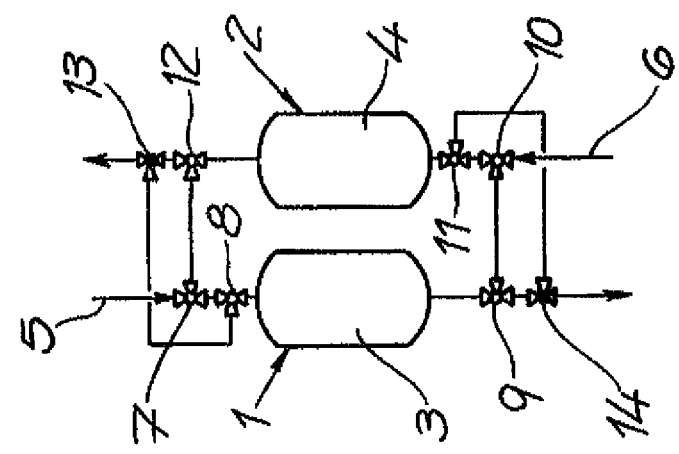
Figure 2:
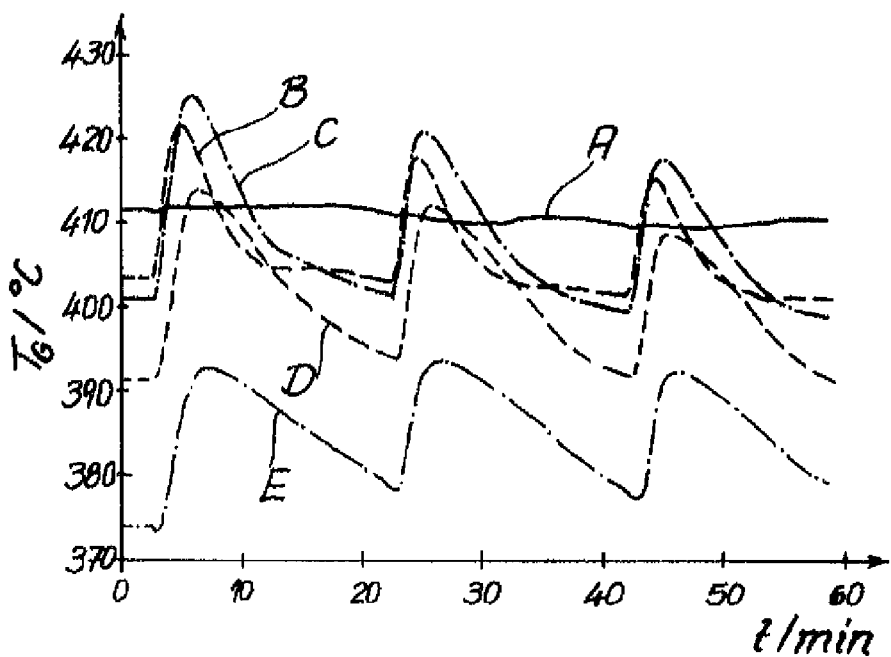
Figure 3:
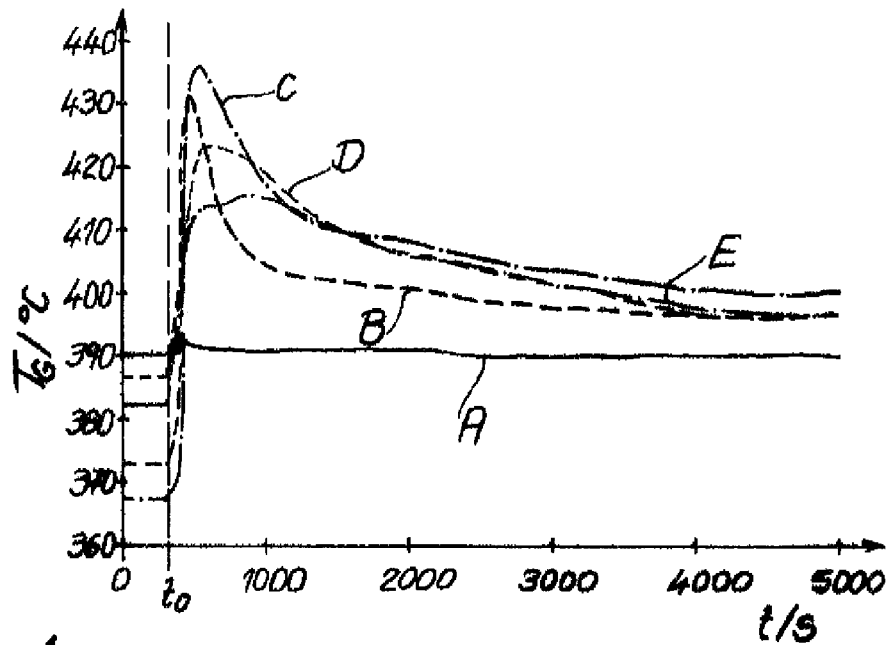
Figure 4:
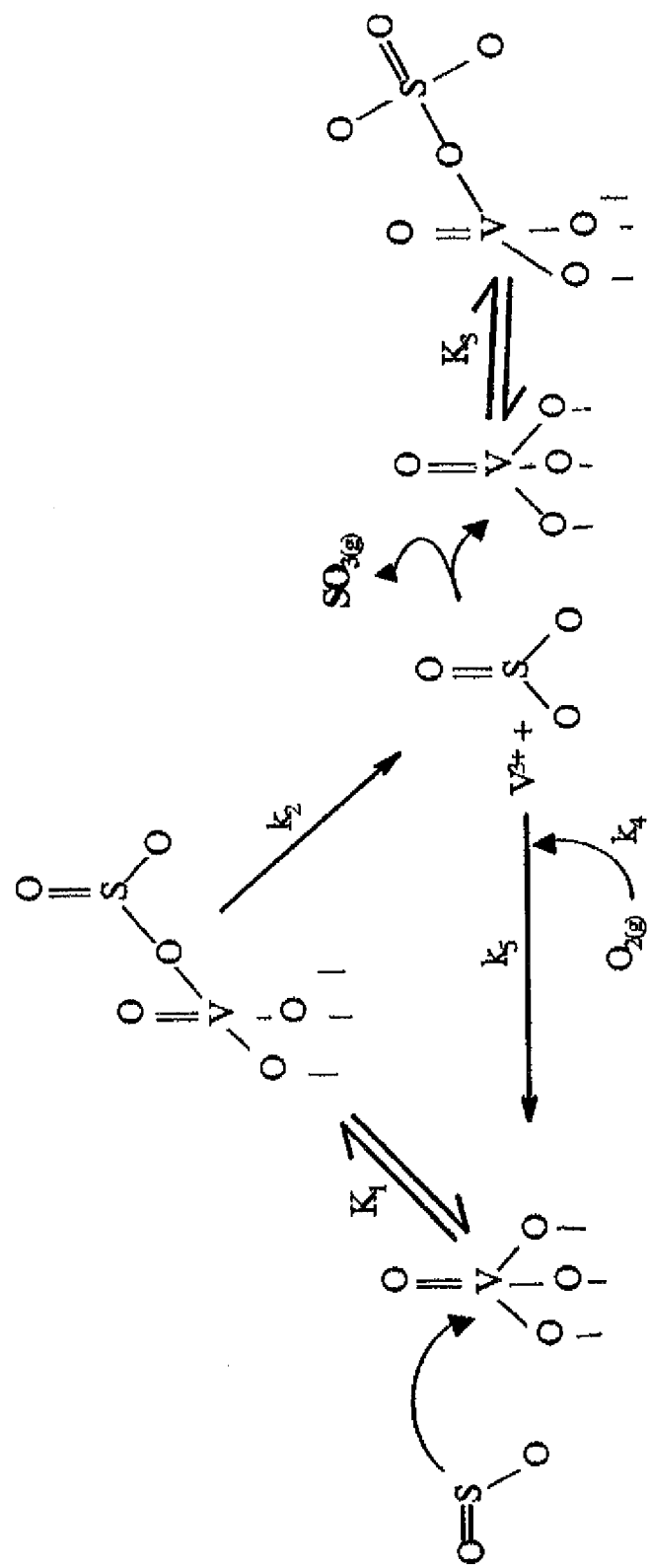
Figure 5:
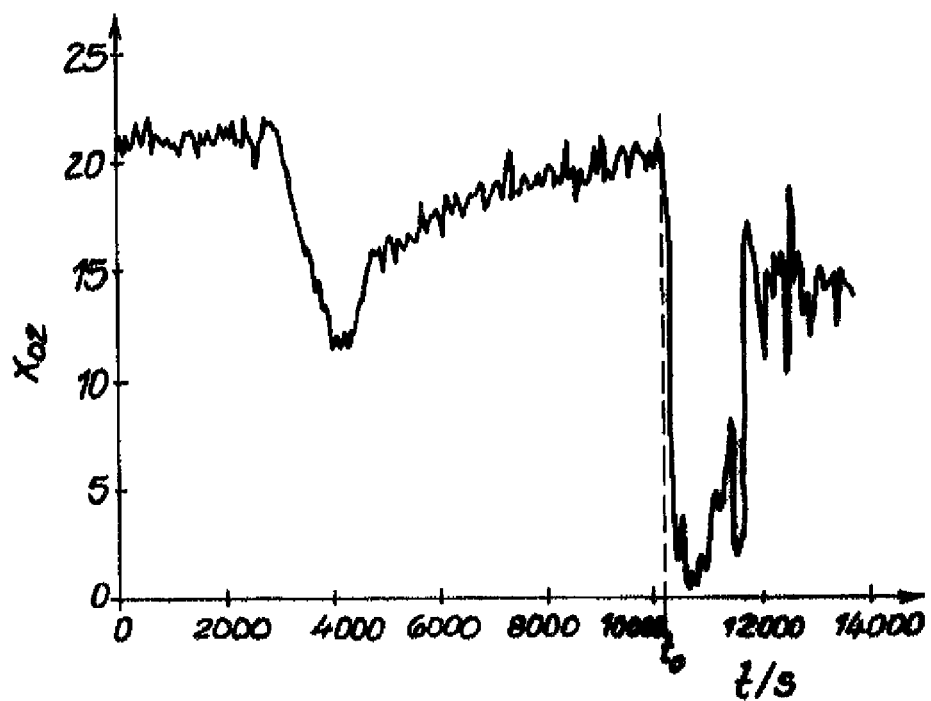
Figure 6:
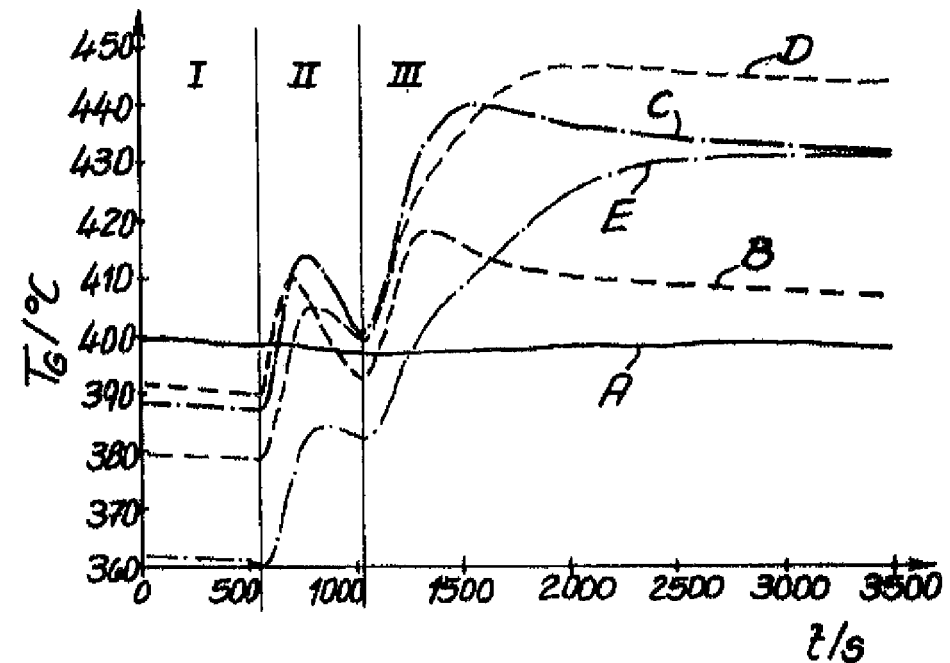

Further characteristics and advantages of the invention are evident from the description of exemplary embodiments, using drawings, and from the drawings themselves. These show:

FIG. 1a a schematic of two reaction chambers for converting $SO_2$ to $SO_3$,

FIG. 1b a schematic in which the product gas stream flows through the left reaction chamber, FIG. 1c a schematic in which the product gas stream flows through the right reaction chamber, FIG. 2 temperature profiles measured in a pilot plant during periodic reactor operation, FIG. 3 temperature profiles during a start-up process, measured in a pilot plant, FIG. 4 the reaction mechanism of sulfur dioxide oxidation on vanadium pentoxide, FIG. 5 an online concentration measurement using a Raman spectroscope during the warm-up phase and the start of the reaction, FIG. 6 temperature profiles during a warm-up phase, a reduction phase and a reaction phase, measured in a pilot plant.

FIG. 1a shows the reaction chambers 1 and 2, which are part of a sulfuric acid production process. Conversion of $SO_2$ to $SO_3$ takes place in reaction chambers 1, 2. The reaction chambers 1, 2 are structured as contact reactors. The catalysts 3, 4 are located in the reaction chambers 1, 2. The catalysts 3, 4 are introduced into the reaction chambers 1, 2 as bulk packing, and form two catalyst beds on which the conversion to sulfur trioxide takes place. The reaction chambers 1, 2 are operated with the product gas stream 5 and the oxidation gas stream 6 alternately. The direction of the product gas stream 5 that contains sulfur dioxide and the oxidation gas stream 6 is controlled using the three-way valves 7, 8, 9, 10, 11, 12. In addition, the fittings 13, 14 serve to direct the gas streams 5, 6.

FIG. 1b shows an operating phase in which the product gas stream 5 is supplied to the reaction chamber 1. The three-way valves 7, 8 guide the product gas stream 5 to the reaction chamber 1. The sulfur dioxide reacts at the catalyst 3 to produce sulfur trioxide. The product gas stream 5 leaves the reaction chamber 1 and flows, by way of the three-way valve 9 and the fitting 14, to the system part in which conversion of the sulfur trioxide to sulfuric acid takes place. During the operating phase shown in FIG. 1b, the oxidation gas stream 6 flows through the reaction chamber 2. In the exemplary embodiment, the oxidation gas stream 6 is a pure air stream. During this operating phase, the catalyst 4 in the reaction chamber 2 is charged with oxygen from the air, all the way to saturation point. The proportion of oxygen in the oxidation gas stream 6 decreases as it flows through the reaction chamber 2. The oxygen-depleted oxidation gas stream 6 is guided, by way of the three-way valve 12 and the fitting 13, to the combustion chamber, in which the sulfur dioxide is produced. In the combustion chamber, a sulfur source is converted to $SO_2$ with the oxidation gas stream 6.

FIG. 1c shows an operating phase in which the oxidation gas stream 6 is supplied to the reaction chamber 1. The three-way valves 10, 9 guide the oxidation gas stream 6 to the reaction chamber 1. In this operating phase, the flow through the reaction chamber 1 is in the opposite direction to the product gas flow. The catalyst 3 absorbs oxygen from the oxidation gas stream 6. The proportion of oxygen in the oxidation gas stream 6 drops as it passes through the reaction chamber 1. The oxygen-depleted oxidation gas stream 6 leaves the reaction chamber 1 and flows, by way of the three-way valve 8 and the fitting 13, to the combustion chamber, in which the production of sulfur dioxide takes place. In the operating phase shown in FIG. 1c, the product gas stream 5 flows through the reaction chamber 2. The product gas stream is guided to the reaction chamber 2 by way of the three-way valves 7, 12. In this operating phase, the flow through the reaction chamber 2 is in the opposite direction to the oxidation gas flow. During this operating phase, the sulfur dioxide present in the product gas stream is converted to sulfur trioxide on the catalyst 4 in the reaction chamber 2. The product gas stream 5 is supplied to the system part in which the sulfur trioxide is converted to sulfuric acid, by way of the three-way valve 11 and the fitting 14.

FIG. 2 shows a periodic reactor operation implemented in a pilot plant. In the reaction chamber of the pilot plant, four catalyst beds are disposed one above the other. In the diagram shown in FIG. 2, the gas temperature $T_G$ in ° C. is plotted against the time t in minutes. The lines drawn on the diagram represent the following curves:

A: Entrance temperature,
B: Exit bed 1,
C: Exit bed 2,
D: Exit bed 3,
E: Exit bed 4.

One operating cycle in the pilot plant lasts for 20 minutes. A product gas stream 5 containing sulfur dioxide flows through the reactor per cycle during an initial phase of 10 minutes. The product gas stream 5 entering the reactor is composed of 95.5 mol-% nitrogen, 4 mol-% sulfur dioxide, and 0.5 mol-% oxygen. During a second phase also lasting 10 minutes, the oxidation gas stream 6 is supplied to the reactor. The oxidation gas stream 6 entering the reactor is composed of 79 mol-% nitrogen and 21 mol-% oxygen. The oxidation gas stream 6 contains no sulfur dioxide.

FIG. 3 shows temperature profiles measured in the pilot plant during a start-up process. In the diagram shown in FIG. 3, the gas temperature $T_G$ in ° C. is plotted against the time t in seconds. The designations of the curves correspond to the diagram of FIG. 2.

The reaction starts at the time $t_o$. The measured gas temperature reaches a maximum that is up to 50 Kelvin above the temperature reached at the stationary point. These temperature peaks are observed for all reaction conditions and catalysts.

The SMP (saturated metal phase) effect can be observed when a pilot plant is put into operation. The plant is operated with compressed air until a stationary temperature profile is achieved in the reactor. At temperatures above 300° C. in the bulk catalyst packing, the formation of a slight sulfuric acid mist can be observed in a bubble column. The appearance of this mist indicates liquefaction of the hitherto solid metal phase on the catalyst surface. Sulfur trioxide from previous tests bound in the solid phase is thereby released and reacts with the water in the bubble column to produce sulfuric acid. At the same time, the oxygen from the compressed air ($x_{O2}$>20 vol.-%) starts to pass into the metal phase. This substance transport lasts until the metal phase is saturated, the oxygen supply is interrupted, or sulfur dioxide gets into the reactor. When a changeover to a feed mixture of sulfur dioxide and oxygen ($x_{O2}$<10 vol.-%) takes place, the reaction starts immediately, and high reaction rates are achieved, because the supplied sulfur dioxide reacts with the oxygen dissolved in the metal phase. The exothermic reaction leads to a strong increase in the catalyst temperature. The reaction heat is given off to the gas stream by the catalyst particles. As soon as the dissolved oxygen has been consumed, the reaction rate drops, because now the absorption of oxygen from the gas phase is the speed-determining step.

FIG. 4 shows the reaction mechanism of sulfur dioxide oxidation on vanadium pentoxide. All recent studies concerning sulfur dioxide oxidation on vanadium pentoxide assume that the reactions take place in the liquid metal phase. In the publication entitled "Oxidation of Sulfur Dioxide to Sulfur Trioxide over Supported Vanadia Catalysts", Applied Catalysis B: Environmental, Vol. 19, pp. 103-117, 1998, Dunn presents a largely accepted reaction mechanism consisting of 5 sequential and parallel reactions. The reaction 5, the oxidation of $V^{3+}$ to $V^{5+}$, acts as a speed-determining reaction step in the mechanism. Under the conditions that were set in the pilot plant tests shown in FIG. 3, a large part of the vanadium on the catalyst is already in the $5^{th}$ oxidation stage when the reaction begins. Consequently, a different reaction step of the mechanism becomes speed-determining. The total reaction rate is therefore clearly higher under the conditions prevailing in the pilot plant than under the usual reaction conditions.

An online concentration measurement using a Raman spectroscope during the warm-up phase and the start of the reaction is shown in FIG. 5. In the diagram shown in FIG. 5, the molar percentage of oxygen $x_{O2}$ at the reactor outlet is plotted as a percentage against the time t in seconds. The concentration measurement is already started during the warm-up phase, with compressed air. Starting from a temperature of 315° C., the oxygen percentage at the reactor exit drops suddenly to approximately 10 mol-%. Once the reaction starts at time $t_o$, the oxygen component drops even more clearly. The reaction is stopped shortly after the start.

In the test, therefore, about half of the oxygen carried in with the compressed air is bound to the catalyst initially. As the saturation increases and the temperature rises, the proportion of oxygen in the exit stream also rises again. Therefore a significant proportion of oxygen passes over from the compressed air to the metal phase during the warm-up phase.

Temperature profiles measured in the pilot plant during a warm-up phase, a reduction phase, and a reaction phase are shown in FIG. 6. In the diagram shown in FIG. 6, the gas temperature $T_G$ is plotted in ° C. against the time t in seconds. The designations of the curves correspond to those in the diagram of FIG. 2.

During the warm-up phase shown in section I of the diagram, the gas stream is composed of 79 mol-% nitrogen, 21 mol-% oxygen and 0 mol-% sulfur dioxide. During the reduction phase, which is shown in section II of the diagram, the gas stream is composed of 96 mol-% nitrogen, 0 mol-% oxygen and 4 mol-% sulfur dioxide. During the reaction phase, which is shown in section III of the diagram, the gas stream is composed of 90 mol-% nitrogen, 6 mol-% oxygen and 4 mol-% sulfur dioxide.

Tests were therefore carried out during the reduction phase, in which the gas mixture does contain sulfur dioxide, but no oxygen. The temperature progressions in section II confirm that despite the lack of oxygen, heat develops and a reaction therefore takes place. The height of the temperature peaks is clearly lower, however. This can be explained by the fact that the sulfur trioxide formed on the catalyst decomposes back into oxygen and sulfur dioxide in the gas phase, until chemical equilibrium is reached. This endothermic decomposition reaction draws energy from the gas phase, thereby curbing the temperature increase. Now if, following the completed reaction of the oxygen that is already dissolved, a gas mixture with sulfur dioxide and oxygen is supplied during the reaction phase, the temperature peaks shown in section III are clearly less marked. This strengthens the theory that the cause of the temperature peaks and reaction speed peaks is the oxygen dissolved in the metal phase.

The invention claimed is:

1. Method for the production of sulfuric acid, wherein a product gas stream (5) containing sulfur dioxide is produced, which is supplied to a reaction chamber (1), in which a reaction takes place, turning sulfur dioxide into sulfur trioxide in the presence of a catalyst (3), and the resulting sulfur trioxide is converted to sulfuric acid in further system parts, wherein an oxidation stream (6) is supplied to the reaction chamber (1) alternating with the product gas stream (5).

2. Method according to claim 1, wherein the method has at least one further reaction chamber (2) with catalyst (4), wherein in one phase, while the oxidation gas stream (6) is guided through the first reaction chamber (1), the product gas stream (5) flows through the second reaction chamber (2).

3. Method according to claim 2, wherein during one phase in which the product gas stream (5) is fed to the first reaction chamber (1), the oxidation gas stream (6) is supplied to the second reaction chamber (2) and, at the end of this phase, the direction of the gas streams (5, 6) is changed in such a manner that the oxidation gas stream (6) is supplied to the first reaction chamber (1) and the product gas stream (5) is supplied to the second reaction chamber (2), and this cycle is repeated periodically.

4. Method according to claim 1, wherein the catalysts (3, 4) contain vanadium pentoxide.

5. Method according to claim 1, wherein air is used as the oxidation gas stream (6).

6. Method according to claim 1, wherein the oxidation gas stream (6) contains no sulfur dioxide.

7. Method according to claim 1, wherein the product gas stream (5) contains an oxygen component of less than 1 mol %.

8. Method according to claim 1, wherein the oxidation gas stream (6) is used to produce sulfur dioxide after it has flowed through a reaction chamber (1, 2).

9. System for the production of sulfuric acid, wherein a product gas stream (5) containing sulfur dioxide is produced in a combustion chamber, which stream is supplied to a reaction chamber (1), in which a reaction takes place, turning sulfur dioxide into sulfur trioxide in the presence of a catalyst (3), and the resulting sulfur trioxide is converted into sulfuric acid in an absorber, and the system comprises fittings (7 to 14), which control the gas streams (5, 6) in the system, wherein the system has at least one further reaction chamber (2) with a catalyst (4), wherein the fittings (7 to 14) can be controlled in such a manner that an air stream (6) can be supplied to the reaction chambers (1, 2), alternating with the product gas stream (5).

10. System according to claim 9, wherein the fittings (7 to 14) can be controlled in such a manner that the oxidation gas stream (6) can be used to produce sulfur dioxide in the combustion chamber, after it has passed through a reaction chamber (1, 2).

* * * * *